US008117170B2

(12) United States Patent
Kleewein et al.

(10) Patent No.: US 8,117,170 B2
(45) Date of Patent: Feb. 14, 2012

(54) TRANSIENT RANGE VERSIONING BASED ON REDIRECTION

(75) Inventors: James C. Kleewein, San Jose, CA (US); Edison Lao Ting, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1088 days.

(21) Appl. No.: 10/711,808

(22) Filed: Oct. 6, 2004

(65) Prior Publication Data

US 2006/0075000 A1    Apr. 6, 2006

(51) Int. Cl.
 *G06F 7/00* (2006.01)
 *G06F 17/30* (2006.01)
(52) U.S. Cl. ......... 707/687; 707/694; 707/695; 707/700
(58) Field of Classification Search .................. 707/203
 See application file for complete search history.

(56) References Cited

U.S. PATENT DOCUMENTS

| | | | | |
|---|---|---|---|---|
| 5,706,510 | A  * | 1/1998 | Burgoon ....................... | 707/203 |
| 5,805,899 | A    | 9/1998 | Evans et al. ................... | 395/712 |
| 6,439,783 | B1   | 8/2002 | Antoshenkov ................. | 395/603 |
| 6,449,705 | B1   | 9/2002 | Peloquin et al. .............. | 711/173 |
| 6,516,320 | B1 * | 2/2003 | Odom et al. ................... | 707/101 |
| 6,578,026 | B1 * | 6/2003 | Cranston et al. ................ | 707/2 |
| 6,584,459 | B1 * | 6/2003 | Chang et al. ...................... | 707/3 |
| 6,665,864 | B1   | 12/2003 | Kawahito et al. ............. | 717/151 |
| 6,957,236 | B1 * | 10/2005 | Ganesh et al. ................ | 707/204 |
| 7,007,027 | B2 * | 2/2006 | Najork et al. ................... | 707/10 |
| 2002/0097724 | A1 | 7/2002 | Halme et al. .................. | 370/392 |
| 2002/0133594 | A1 | 9/2002 | Syvanne ........................ | 709/226 |
| 2003/0018778 | A1 | 1/2003 | Martin et al. ................. | 709/224 |
| 2003/0061599 | A1 | 3/2003 | Bates et al. ................... | 717/129 |
| 2003/0120932 | A1 | 6/2003 | Epstein ......................... | 713/181 |
| 2003/0182414 | A1 | 9/2003 | O'Neill ......................... | 709/223 |

* cited by examiner

*Primary Examiner* — Jay Morrison
(74) *Attorney, Agent, or Firm* — IP Authority, LLC; Ramraj Soundararajan

(57) ABSTRACT

A method (and an article of manufacture having computer readable program code to implement the method) is disclosed to version a node range and locate a versioned node range in a storage architecture, wherein the method comprises: maintaining a set of node ranges, with each node range being formed from a range of node ID values assigned to each node among a plurality of nodes, receiving a node modification request for a node range from a database system, versioning the node range by copying (to a storage) a node range to which the node modification request is to be made, labeling the copied node range with a timestamp, locating the labeled node range via the timestamp and a hash on the node range, and outputting the located labeled node range. Optionally, versioning is done by shadowing nodes in the range to a version hash table based on a range identifier.

22 Claims, 6 Drawing Sheets

TRANSIENT RANGE VERSIONING BASED ON REDIRECTION

BACKGROUND OF THE INVENTION

The present invention relates generally to the field of versioning. More specifically, the present invention is related to range versioning based on redirection.

DISCUSSION OF PRIOR ART

A common problem in database systems relates to how it handles scenarios wherein multiple users try to access the same document. For example, when user A opens a document A for updating at time t=1, should the database render the committed or uncommitted document to user B at time t=2. To address this problem, database servers support various isolation levels.

FIG. 1 illustrates some examples of common isolation levels in present day database systems. The "repeatable read" (RR) isolation level is the most restrictive isolation level wherein locks are placed on all data needed by a query, thereby preventing others from updating. On the opposite side of the spectrum is the least restrictive "uncommitted read" (UR) isolation level. The UR isolation level is commonly referred to as a "dirty read," wherein users are able to see changes prior to the commitment of such changes.

Additional isolation levels exist in the middle of the spectrum. For example, a "read stability" (RS) isolation level provides for no change in rows which have been read until the logical unit of work (LUW) ends. Another such example of an isolation level falling in the middle of the spectrum is the "cursor stability" (CS) isolation level, wherein the row to which the cursor points cannot be changed.

Another way database systems address the problem of multiple users trying to access the same data is via the use of versioning. FIG. 2 illustrates a simple example of versioning. At time t=1, both user$_1$ and user$_2$ are able to access document A. When user$_1$ is ready to modify/update document A, the database system makes a copy of document A in storage, and at time t=2, user$_1$ works off the copy in storage as a versioned document, while user$_2$ is still served document A from its previous location.

FIG. 3a illustrates extends the example of FIG. 2 to depict versioning in page memory. In this example, at time t=1, both user$_1$ and user$_2$ are able to access document A which is stored on Page 1 of memory. When user$_1$ is ready to modify/update document A, the database system makes a copy of document A into Page 2 of memory, and at time t=2, user$_1$ works off the copy in Page 2 as a versioned document, while user$_2$ is still served document A from Page 1.

Both the examples of FIG. 2 and 3a are examples of versioning without redirection. FIG. 3b illustrates versioning in page memory systems with redirection. In this example, at time t=1, both user$_1$ and user2 are able to access document A which is stored on Page 1 of memory. When user$_1$ is ready to modify/update document A, the database system makes a copy of document A into Page 2 of memory, and at time t=2, user$_1$ works off the copy in Page 1 as a versioned document, while user$_2$ is redirected to Page 2.

The following references provide general background in the area of versioning, but none of them teach the present invention's transient range versioning based on redirection.

The patent to Evans et al. (U.S. Pat. No. 5,805,899) provides for a method and apparatus for internal versioning of objects using a mapfile. The Evans et al. method discloses the management of versioned objects that comprise a software program using a mapfile. It provides methods for executing and linking objects of a program by determining the appropriate versions of each object to use in execution. However, it should be noted that Evans et al. fail to teach the grouping of objects into ranges. Furthermore, Evans et al. fail to disclose versioning ranges of objects and storing such versioned ranges in either transient or permanent storage.

The patent to Antoshenkov (U.S. Pat. No. 6,439,783) provides for a range-based query optimizer for use with a database system having a set of records. The disclosed method scans database records by maintaining interval and range information to be able to skip scanning records that do not satisfy queries and scanning only those that do. It should be noted that the Antoshenkov reference fails to teach versioning ranges of objects and storing such versioned ranges in either transient or permanent storage.

The patent to Peloquin et al. (U.S. Pat. No. 6,449,705) provides for a method and apparatus for improving performance of drive linking through the use of hash tables. The disclosed method routes requests to volumes by assigning drive volumes into zones and using a zone table. Peloquin et al., however, fail to teach ranges of objects, versioning ranges of objects, or storing versioned ranges of objects in either transient or permanent storage.

The patent to Odom et al. (U.S. Pat. No. 6,516,320) provides for tiered hashing for data access. Odom et al. disclose a method for building a tiered index structure that includes building a first-level index structure having a predetermined number of entries, building a second-level index structure having a dynamic number of entries, and establishing a link between an entry in the first-level index structure and an entry in the second-level index structure. Odom et al., however, fail to teach versioning in a nodal structure.

The patent to Kawahito et al. (U.S. Pat. No. 6,665,864) provides for a Method and apparatus for generating code for array range check and method and apparatus for versioning. Kawahito et al., however, fail to teach versioning in a nodal structure.

Whatever the precise merits, features, and advantages of the above cited references, none of them achieves or fulfills the purposes of the present invention.

SUMMARY OF THE INVENTION

The present invention provides for a method for transient versioning in a storage architecture that manages node ranges, wherein the method comprises of: (a) receiving a node modification request (a node deletion request, a node insertion request, a node modification request, etc.) from a database system; (b) copying a node range where said modification is to be made to a transient storage; (c) labeling the copied node range with an identifier (e.g., timestamp or LSN); and wherein said labeled node range is locatable via said identifier and a hash on said node range.

The present invention also provides for a method for transient versioning in a storage architecture that manages node ranges via a node id range index, wherein each node is assigned a node id value and a set of nodes form a node range. Each entry in the node id range index points to a node range and its range identifier, RID. The method comprises the steps of: (a) receiving a node modification request for a range; (b) shadowing nodes in said range to a Version Hash Table based on RID; (c) assigning a time identifier (e.g., timestamp or LSN) to copies of said range; wherein a node in said shadowed range is locatable via said time identifier and RIDs. New readers, after a modification, access current nodes through a new RID and old readers access old nodes via the same RID, with the shadowed copy being locatable in said Version Hash Table by hashing the same RID. In one embodiment, when modifications cause nodes in a range to be moved to a new RID, previous readers are redirected from the new RID to the old RID via a Redirection Hash Table. In another embodiment, when modifications cause nodes in a range to be moved to a new RID, previous readers are redirected from the new RID to the old RID via an index that describes where old versions are in said Version Hash Table. In another embodiment, for range deletions, the range being deleted is moved to reserved RID RIDFF.

The present invention also provides computer medium carrying computer readable program code implementing the above-mentioned methods.

DESCRIPTION OF THE PREFERRED EMBODIMENTS

Figure 1:
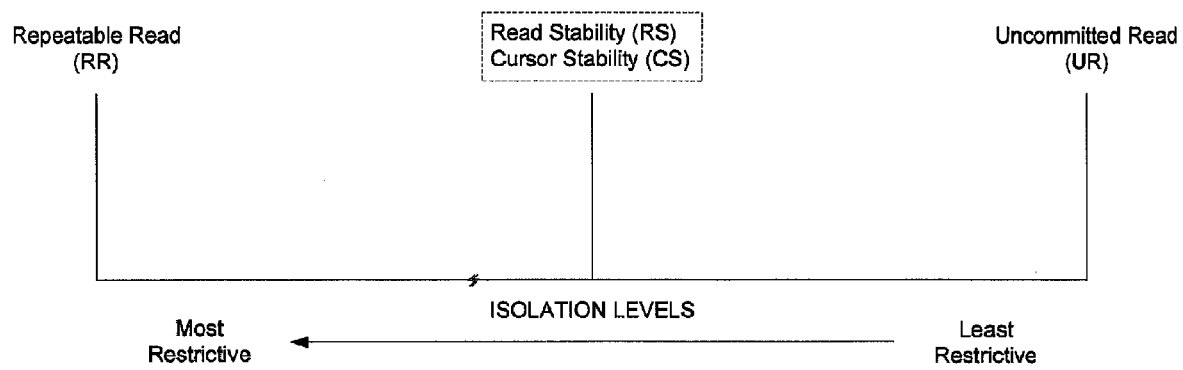
FIG. 1 illustrates some examples of common isolation levels in present day database systems.
Figure 2:
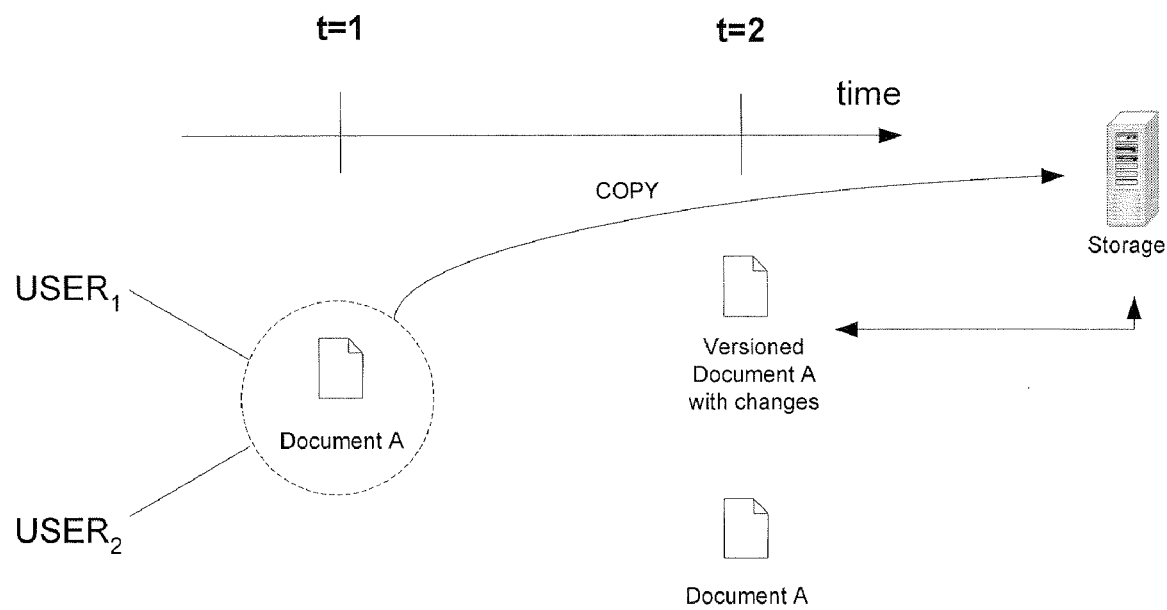
FIG. 2 illustrates a simple example of versioning.
Figure 3A:
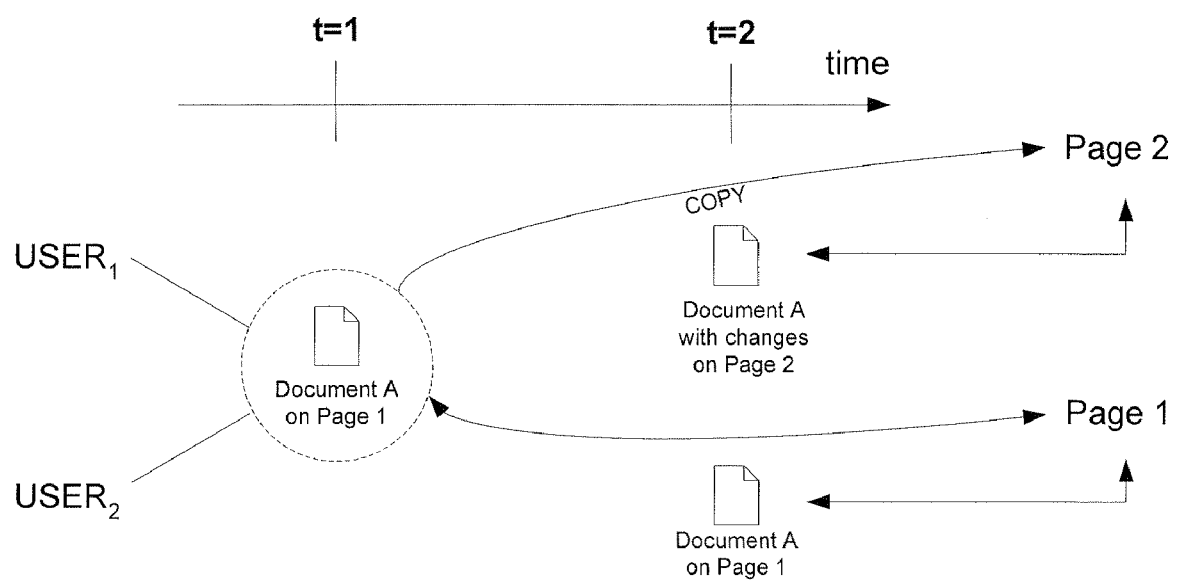
FIG. 3a illustrates extends the example of FIG. 2 to depict versioning in page memory.
Figure 3B:
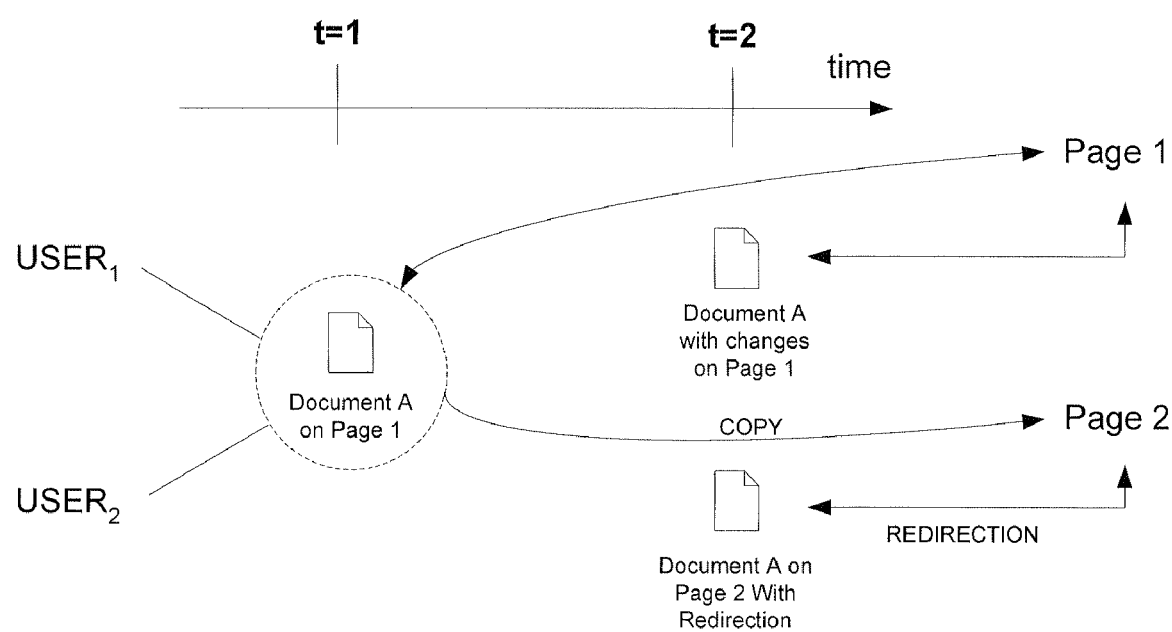
FIG. 3b illustrates versioning in page memory systems with redirection.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The present invention provides a mechanism for transient versioning in architectures that manage node ranges. In architectures that manage node ranges, each node is assigned a node ID value, and a set of nodes form a range of node IDs called a node range. To find a node among a set of node ranges, an index is used. This index, called node ID range index, points to the set of node ranges. Each entry in the index describes one range and points to where the range is located. Individual nodes are located by finding the correct range in the index.

When nodes are added to or deleted from a node range, the range of nodes can be versioned. The range of nodes can be versioned by copying the nodes before changes, to transient storage, and then the original nodes are modified. Different versions can be tracked by assigning timestamps to each copy of the node range. For example, at time 1, the range 1 to 10 is located in R1, if at time 2, we insert 8 into 1 to 10 in R1, the old version of the range 1 to 10, without 8 at time 1, needs to be copied to transient storage, labeled that it is from time 1, and locatable through a hash on R1. Then old readers (looking for 1 to 10 at time 1) would use the index, check the time stamp of R1 which is now at time 2, and hash on R1 to get the old version of the range 1 to 10 at time 1.

Since old versions are found through a hash on the current location, a problem exists when node ranges split, merge, move, or gets deleted, because the node range index is no longer correct as far as old readers are concerned. That is, if the range 1 to 10 in R1 were to split into 1 to 4 in R2 and 5 to 10 in R1, old readers looking for 1 to 4 hashes R2, but the old version 1 to 10 is actually copied and hashed on R1. This problem is solved by redirecting the old reader to hash on the previous location to find the old version.

Each entry in the node ID range index points to the location of the nodes in a range. The location is called the range identifier or RID. Before changes are made in a range, the nodes in a range are copied (shadowed) to a Version Hash Table based on the RID. Every copy of the range including the current one is assigned a timestamp or LSN. New readers after a change, access the current nodes through RID, while old readers access the old nodes through the same RID, but hashing it to find the shadowed copy in the Version Hash Table. This works as long as long as old and new ranges end up with the same RID in the index. However, if changes causes nodes in the range to be moved to a new RID, previous readers need to be redirected from the new RID to the old RID. These readers will be redirected from the new RID to the old RID via a Redirection Hash Table. Instead of a Redirection Hash Table, an index that describes where old versions are in the Version Hash Table can also be used.

Figure 4:
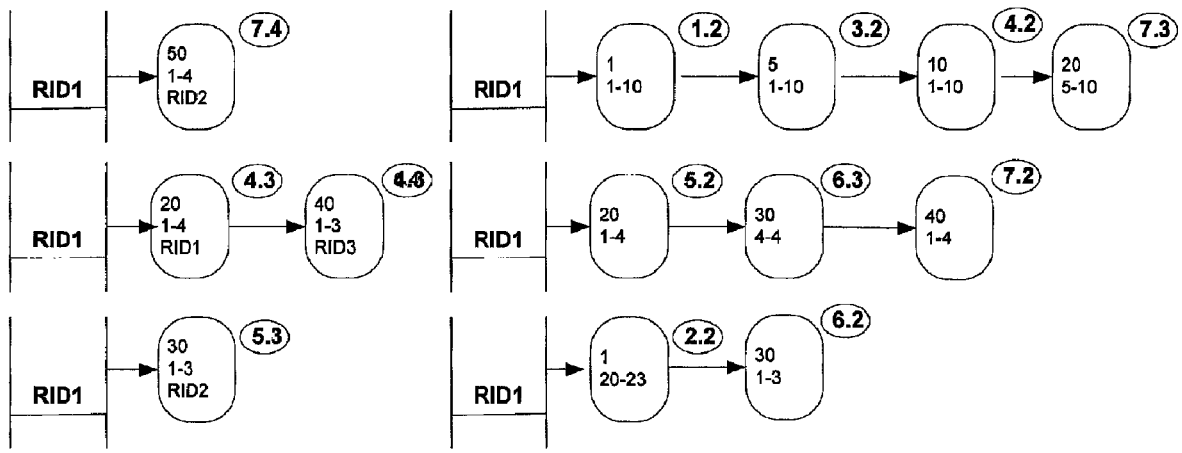
FIG. 4 illustrates transient range versioning based on hash redirection.

FIG. 4 illustrates transient range versioning based on hash redirection. In FIG. 4, for example, at LSN20, the range 1-4 is moved from RID1 to RID2 (4.1). The Version Hash Table shadows the range 1-10 in RID1 before the change at LSN 10 (4.2). Old readers from LSN 11 to 19 looking for nodes 1 to 4 consult the node range index and get RID2. These readers need to be redirected from RID2 to RID1 via the Redirection Hash Table, to find the matching Version Hash Table entry for RID1 (4.3).

For any reader, with ReadLSN, if there are Redirection Hash entries with LSN>ReadLSN, but no matching range, no redirection is required to hash the Version Hash Table. If there are Version Hash entries with matching ranges, but LSN>ReadLSN, then the Redirection Hash needs to be used again for redirection.

At Time 20,

Updater moves range 1-4 from RID1 to RID2 (4.1). This involves deleting 1-4 from RID1 and inserting 1-4 to RID2. Prior to deletion, 1-10 is shadowed using the last page LSN and hashing RID1 (4.2). Because 1-4 is moved to RID2 from RID1, hash entry for RID2 is created for all readers prior to the move, looking for 1-4 to be redirected to RID1 (4.3).

At Time 40,

Updater moves range 1-3 from RID3 to RID2 with 4-4 (6.1). This involves deleting 1-3 from RID3 and merging 1-3 to RID2 with 4-4. Prior to movement 1-3 is shadowed (6.2) and 4-4 is shadowed (6.3). Because 1-3 will move to RID2 from RID3, hash entry for RID2 is created to redirect all readers prior to move, looking for 1-3, to hash RID3 (6.4).

At Time 30,

Reader LSN 22 looks for 3, finds RID3 pageLSN>readLSN so hashes RID3 on Redirection Hash, finds first entry with LSN>readLSN containing 3 in (5.3). Hashes RID2 on Version Hash, finds last entry <LSN 22 containing 3 in (5.2).

At Time 30,

Reader LSN 18 looks for 3, finds RID3 pageLSN>readLSN so hashes RID3 on Redirection Hash, finds first entry with LSN>readLSN containing 3 in (5.3). Hashes RID2 on Version Hash, looks for entry<readLSN containing 3, not found since first entry already has pageLSN>readLSN so hashes RID2 on Redirection Hash, finds first entry with LSN>readLSN containing 3 in (4.3). Hashes RID1 on Version Hash, finds last entry<LSN 18 containing 3 in (4.2).

At Time 40,

Reader LSN 32 looks for 4, hashes RID2 on Redirection Hash, no entry with 4 and LSN>32, hashes RID2 on Version Hash Table, finds last entry<LSN 32 in (6.3).

At Time 40,

Reader LSN 22 looks for 4, hashes RID2 on Redirection Hash, no entry with 4 and LSN>22, hashes RID2 on Version Hash Table, finds last entry<LSN 22 in (5.2).

At Time 50,

Reader LSN 11 looks for 4, hashes RID1 on Redirection Hash, finds first entry with 4 and LSN>11 in (7.4). Hash RID2 on Version Hash, no entry with LSN<11, hashes RID2 on Redirection Hash, finds entry with LSN>11 containing 4 in (4.3). Hashes RID1 on Version Hash, finds last entry with LSN<11 containing 4 in (4.2).

Figure 5:
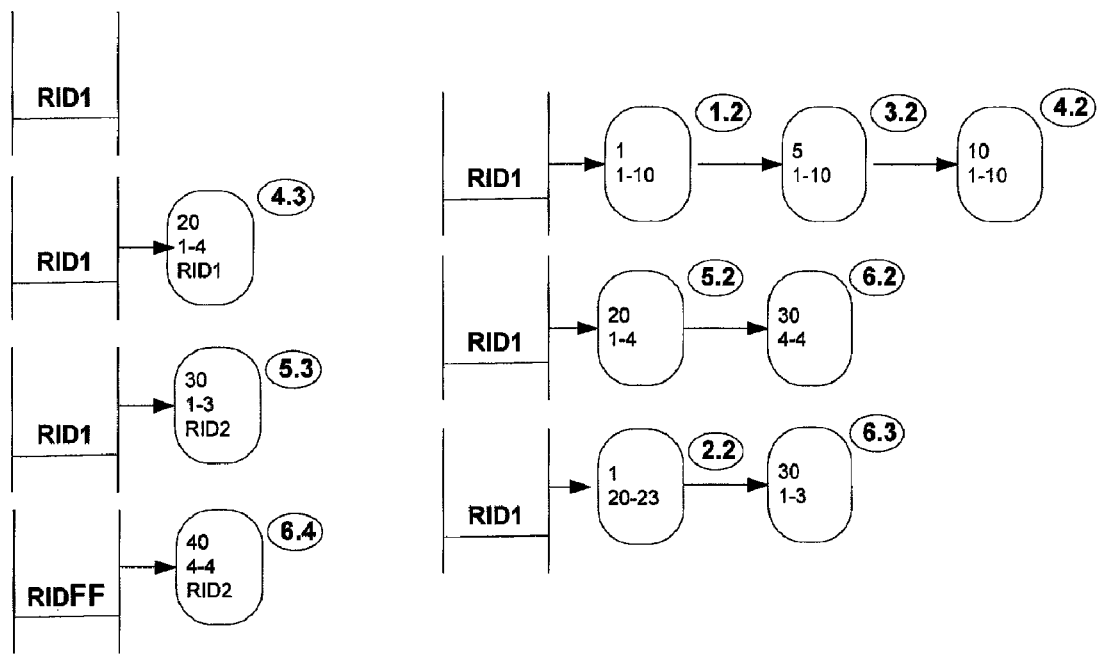
FIG. 5 illustrates range deletions wherein the range being deleted is moved to a reserved RID ridFF.

FIG. 5 illustrates transient range versioning based hash redirection, wherein Range Deletions can be treated as if the range being deleted is moved to reserved RID RIDFF. The reader should hash the Redirection Hash Table on RIDFF to find the correct Version Hash Table entry.

At Time 40,

Updater deletes range 4-4 in RID2 (6.1). Because 4-4 is deleted, it is shadowed in (6.2). 1-3 is shadowed on the assumption that it needs to be updated to know that 4-4 is deleted (6.3). A Redirection Hash entry is added for RIDFF in (6.4) for the deleted range 4-4.

Reader LSN 32 looks for 4, hashes on the Redirection Hash for RIDFF in (6.4). Hashes RID to find the Version Hash entry in (6.2).

Hence, the present invention's versioning approach favors new and recent readers as opposed to old readers, as old versions of data are copied out (for example, to transient storage), and old readers have to be redirected to them. Therefore, old readers are penalized, but new and recent readers are favored as they are least likely to be redirected.

The present invention's approach also helps clustering, as old versions of data are copied out to temporary storage and remaining space is used to store new data. The latest data is always kept in or near the same place where the old data was.

Additionally, the present invention provides for an article of manufacture comprising computer readable program code contained within implementing one or more modules for transient versioning based in redirection. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) receiving a node modification request for a range; (b) shadowing nodes in said range to a Version Hash Table based on RID; (c) assigning a time identifier to copies of said range; wherein a node in said shadowed range is locatable via said time identifier and RIDs.

CONCLUSION

A system and method has been shown in the above embodiments for the effective implementation of transient range versioning based on redirection. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of database programming.

What is claimed is:

1. A computer-based method to version a node range and locate a versioned node range in a storage architecture managing node ranges, said computer-based method implemented in computer readable program code stored in computer memory, said computer-based method comprising the steps of:
   a. maintaining a set of node ranges, each node range formed from a range of node ID values assigned to each node among a plurality of nodes;
   b. receiving a node modification request for a node range from a database system;
   c. versioning said node range by copying, to a storage, a node range to which said node modification request is to be made;
   d. labeling said copied node range with an timestamp;
   e. locating said labeled node range via said timestamp and a hash on said node range; and
   f. outputting said located labeled node range.

2. The computer-based method of claim 1, wherein said storage is a transient storage.

3. The computer-based method of claim 1, wherein said node modification request is any of the following: a node insertion request, a node update request, or a node deletion request.

4. The computer-based method of claim 1, wherein said method is implemented across a network.

5. The computer-based method of claim 4, wherein said network is any of the following: a local area network, a wide area network, or the Internet.

6. The computer-based method of claim 1, wherein said node ranges are associated with hierarchical node data that is derived from any of: a structured document, a computer network, or a directory file system.

7. The computer-based method of claim 6, wherein said structured document is an XML document.

8. A computer-based method to version a node range and to locate a versioned node range in a storage architecture, said computer-based method implemented in computer readable program code stored in computer memory, said method comprising the steps of:
   a. maintaining a set of node ranges, each node range formed from a range of node ID values assigned to each node among a plurality of nodes;
   b. maintaining a node id range index, each entry in said node id range index pointing to a node range and its range identifier, RID;
   c. receiving a node modification request for a range;

d. versioning said range associated with said node modification request by shadowing nodes in said range to a Version Hash Table based on RID and assigning a time identifier to copies of said range;

e. locating a node in said shadowed range via said time identifier and RIDs; and f. outputting said located node range.

9. The computer-based method of claim 8, wherein said time identifier is any of the following: timestamp or LSN.

10. The computer-based method of claim 8, wherein new readers, after a modification, access current nodes through a new RID.

11. The computer-based method of claim 8, wherein previous readers access old nodes via the same RID and hashing the same RID to locate the shadowed copy in said Version Hash Table.

12. The computer-based method of claim 8, wherein when modifications cause nodes in a range to be moved to a new RID, previous readers are redirected from the new RID to an old RID via a Redirection Hash Table.

13. The computer-based method of claim 8, wherein when modifications cause nodes in a range to be moved to a new RID, previous readers are redirected from the new RID to an old RID via an index that describes where old versions are in said Version Hash Table.

14. The computer-based method of claim 8, wherein said shadowed nodes are copied to a transient storage.

15. The computer-based method of claim 8, wherein said method is implemented across a network.

16. The computer-based method of claim 15, wherein said network is any of the following: a local area network, a wide area network, or the Internet.

17. The computer-based method of claim 8, wherein, for range deletions, the range being deleted is moved to reserved RID RIDFF.

18. The computer-based method of claim 17, wherein a reader hashes a Redirection Hash Table on RIDFF to find a correct Version Hash Table entry.

19. The computer-based method of claim 8, wherein said node ranges are associated with hierarchical node data that is derived from any of: a structured document, a computer network, or a directory file system.

20. The computer-based method of claim 19, wherein said structured document is an XML document.

21. The computer-based method of claim 8, wherein said node modification request is any of the following: a node insertion request, a node update request, or a node deletion request.

22. An article of manufacture comprising a non-transitory computer useable medium having computer readable program code embodied therein which, when executed by a computer, implements a method to version a node range and to locate said versioned node in a storage architecture, said medium comprising:

a. computer readable program maintaining a set of node ranges, each node range formed from a range of node ID values assigned to each node among a plurality of nodes;

b. computer readable program maintaining a node id range index, each entry in said node id range index pointing to a node range and its range identifier, RID;

a. computer readable program code identifying a node modification request for a range;

b. computer readable program code versioning said range associated with said node modification request by shadowing nodes in said range to a Version Hash Table based on RID and assigning a time identifier to copies of said range;

c. computer readable program code locating a node in said shadowed range via said time identifier and RIDs; and d. computer readable program code outputting said located node range.

* * * * *